Aug. 9, 1966  R. F. RASMUSSEN  3,265,332
AUTOMATIC AND MANUAL CONTROL APPARATUS FOR AIRCRAFT
Filed Sept. 17, 1964
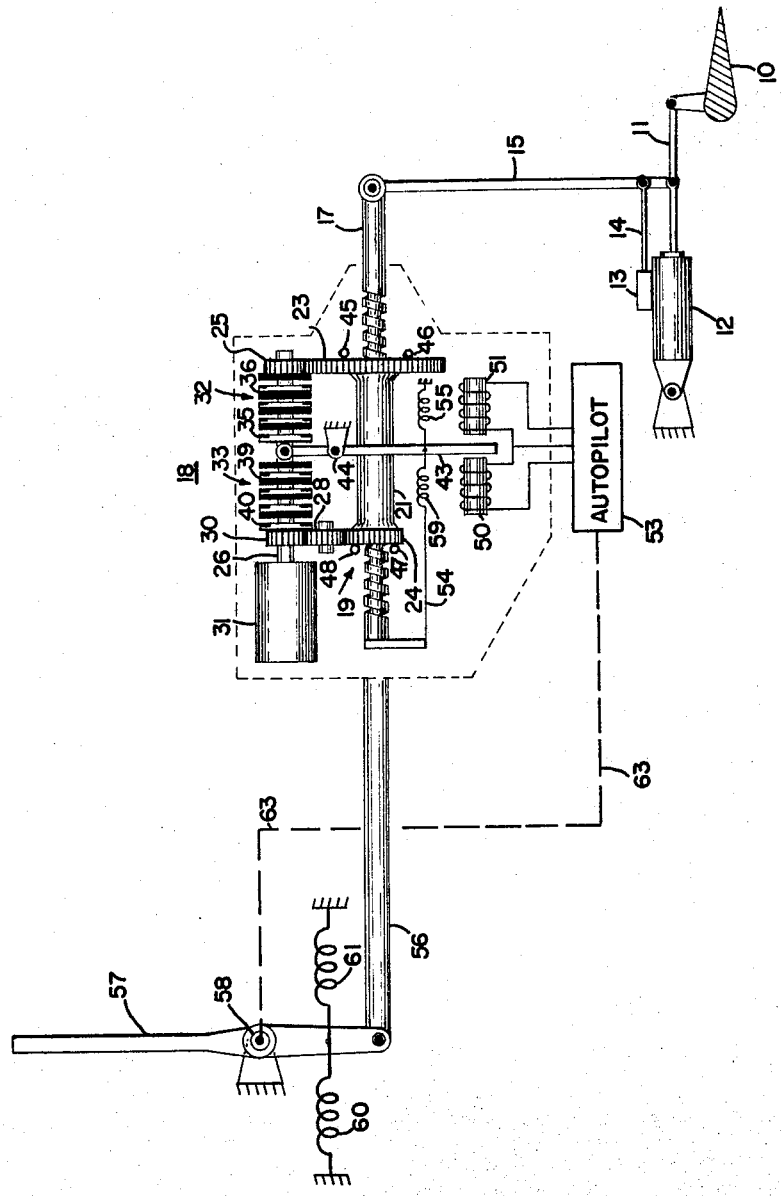
INVENTOR.
ROBERT F. RASMUSSEN
BY *Gordon Reed*
ATTORNEY

3,265,332
AUTOMATIC AND MANUAL CONTROL APPARATUS FOR AIRCRAFT

Robert F. Rasmussen, Brooklyn Center, Minn., assignor to Honeywell Inc., Minneapolis, Minn., a corporation of Delaware
Filed Sept. 17, 1964, Ser. No. 397,256
8 Claims. (Cl. 244—76)

This invention generally relates to improvements in maneuvering automatic pilots for navigable craft and more particularly to an automatic pilot system having integrated, manually operated controls and automatically operated controls wherein a "series arranged" servomotor is connected between a manual controller and a control device for an aircraft, for selectively and continuously controlling the craft attitude either automatically through the series servomotor or manually without interruption by operation of the manual controller. Arrangements of the above general type have been heretofore provided as in the Cooper et al. Patent 2,890,844. The present invention is concerned primarily with a novel servomotor arranged in the "series relation" wherein operation of the servomotor does not affect position of the manual controller and corresponding thus to the motor 16 of the Cooper et al. patent.

An object of this invention is to provide in a maneuvering automatic pilot of the above type an improved servomotor arranged in a "series" relationship said servomotor including a motor of the electrically energized constantly rotating type and having a pair of alternatively engageable clutches for reversibly driving an output member.

A further object of this invention is to provide an improved maneuvering automatic pilot utilizing a continuously rotating motor and a pair of alternatively engageable clutches wherein the engagement of either clutch is electrically controlled.

It is a further object of this invention to provide a series arranged servomotor having its output member connected through a screwjack arrangement between a manual controller and a surface actuator, with means driven with the jackscrew for additionally controlling a clutch actuator of the servomotor.

It is a further object of this invention to provide a servomotor in a "series" arranged maneuvering automatic pilot for dirigible craft which on the occurrence of a malfunction in the energization of a normally continuously rotating motor of the servomotor causes the inertia of the continuously rotating motor to drive to its normally centered position thereby maintaining a desired positional relationship between a manual controller and a control surface of the craft.

It is a further object of this invention to provide in a maneuvering type automatic pilot system having a series arranged servomotor therein an arrangement for centering said series servomotor upon a malfunction in the operating of the motor and the control means therefor.

Other objects and advantages of the invention will be more readily apparent from the following detailed description taken in conjunction with the accompanying drawing, schematically illustrating one embodiment of the invention.

Referring now to the drawing, a control surface 10 of a navigable or dirigible craft such as an aircraft is rotated for control purposes about an axis of support by an outer member 11 of an actuator 12. The actuator 12 may be of the fluid operated type and includes a control valve 13 positioned by a rod 14 pivoted to a differential lever 15 having one end pivoted to output member or rod 11 and its opposite end pivoted to an output member 17 of a servomotor arrangement 18. The member 17 may be a rod having threads 18 and forming part of an irreversible screw jack arrangement 19 having additionally a rotatable member 21 suitably mounted on the frame of servo 18 and internally threaded for coaction with the threads on member 17 for axial movement of the member 17. For rotational drive purposes, the member 21 carries at one end a large gear 23 and carries rigidly therewith a smaller gear 24 at its opposite end. Gear 23 meshes with its drive gear 25 loosely carried by a motor driven shaft 26. Gear 24 meshes with an intermediate gear 28 which in turn engages a second gear 30 also loosely carried on shaft 26. Shaft 26 is constantly or continuously rotated by an actuator such as an electric motor 31 connected to a suitable electrical power source.

Rotation of the member 21 in one direction from the continuously rotating actuator motor 31 is effected through one clutch 33 and rotation of the member 21 in the opposite direction is effected through a second clutch 32. Clutch 32 consists of a driving element 35 which rotates with the shaft 26 but is axially moveable thereon, as by a slot and key arrangement, and a second element 36 carried by the gear 25 and integral therewith. Similarly, clutch 33 consists of a drive element 39 mounted on shaft 26 and rotated thereby but axially moveable thereon and a second clutch element 40 carried by gear 30.

The clutches 32, 33 are operated by a clutch engage-disengage lever 43 pivoted at 44 and suitably engaging the two continuously driven clutch members 35, 39 axially movable on shaft 26. Thus when lever 43 is moved clockwise in the figure, clutch 32 is engaged whereby a drive from motor 31 is effected to rotate gear 25 which through gear 23, drives the member 21 in one direction. When the lever 43 is rotated counterclockwise, the clutch 33 is engaged to effect a drive from continuously driven shaft 26, clutch drive member 39, driven clutch element 40 and gear 30, intermediate gear 28, to the gear 24 on member 21 to reversibly drive the member 21. In order that the rotation of member 21 can result in axial movement of rod 17, with which it is engaged by the threads on members 21 and 17, means are provided to permit only rotational movements of member 21 and not axial movements thereof. Such means are herein illustrated as servo frame mounted ball bearings 45, 46, 47, and 48 which roll against the exposed ends of gears 23, 24.

The pivoted clutch lever 43 may have a force selectively applied thereto in either counterclockwise or clockwise direction by suitable electrical means such as solenoids 50, 51 having windings energized from the output of an autopilot 53. Such autopilots conventionally, as in the Cooper et al. patent, include sensors that sense flight conditions of an aircraft.

For follow-up purposes on the clutch operating lever 43, a spring type arrangement 54 is provided between member 17, lever 43, and the frame of the servo 18. Thus, for example, if solenoid 50 be energized to apply a force tending to rotate clutch lever 43 clockwise thereby engaging clutch 32, member 21 consequently rotates. The rotation of member 21 results in the rightward displacement of axially movable member 17 whereby spring 55 in arrangement 54 and tied to the frame and lever 43 applies an equal counteracting force to the clutch lever 43 and with these equal but opposing forces thereby disengaging clutch 32. In a similar manner when the clutch lever 43 applies a counterclockwise force to engage clutch 33 the shaft 26 which is driven continuously in one direction but because of the intermediate gear 28 now drives the threaded member 21 in the opposite direction to cause axial movement of member 17 leftwardly whereby through the spring 59 of the follow-up arrangement 54 connected between member 17 and lever 43 applies a force to the clutch lever 43 which is thereby centered between solenoids 50, 51. Thereby, in each instance the member 17 is linearly moved in accordance with the magnitude of electrical output of autopilot 53 to either solenoid winding 50 or 51.

For manual control purposes of surface 10 through the actuator 12, a manual controller 57 pivoted at 58 has its lower end connected to a rod 56 also fastened to the frame of servo 18. Centering springs 60, 61 serve to center the manual controller 57, upon release of manual force thereon from an operated position. In order that the autopilot 53 through its sensors does not oppose the maneuvering to be effected through manual controller 57, suitable operating means 63 extends from the manual controller to the autopilot 53 and is operated when force is applied to controller 57, as conventional, to render such sensors ineffective and to condition such sensors for reengagement of automatic control upon release of the manual controller 57.

As stated, the motor 31 is of the electrically energized type and the actuating means for clutch lever 53 are also electrically energized. A feature of the present arrangement is that if there be a failure in the current carrying circuit to solenoid 50 or 51, then if the member 17 be displaced at that time from a normal position, through the follow-up means 54 one or the other of clutches 32 or 33 will be engaged and the drive motor 31 through the screw jack arrangement 19 will return the member 17 to its normal position.

Also, if current to the command solenoids 50, 51 and the drive motor 31 be discontinued say by a malfunction, there is sufficient rotational energy stored in the rotating mass of the members being driven by motor 31 to drive the jack screw arrangement 19 to its neutral or normal centered position with a normal position between the manual controller 57 and surface 10 resulting therefrom.

Furthermore, the motor 31 need only be of power capacity to handle the average of the minimum-maximum load since the "flywheel energy" therein supplies a peak load imposed when either clutch 32 or 33 is engaged. In other words, the motor 31 need only be of power capacity to handle a little more than half the peak power required by the output load upon clutch engagement since the "flywheel energy" therein supplies the remainder of the energy requirement.

While variations in the specific apparatus illustrated and described may be readily provided by those skilled in the art without departing from the spirit and scope of this invention, this invention should be considered as limited only in accordance with the features thereof as set forth in the appended claims.

What is claimed is:

1. In a maneuvering automatic pilot for aircraft: a servomotor means comprising a continuously operated motor having an output member; a further member to be driven from a normal position; a pair of engageable clutches for reversibly positioning the further member from said motor; selective force responsive means for engaging one or the other clutches; first means operating the selective force responsive means; and force applying follow-up means from the further member to the selective means independent of said first means for disengaging an engaged clutch of said pair of clutches.

2. The apparatus of claim 1 with an actuator means controlled by the further member positioning a control surface of an aircraft.

3. In a manual and power operated control system for aircraft having a control surface, and a pilot operated control member, wherein the control system includes: a servomechanism comprising a continuously rotating actuator having an output shaft, a pair of force operated engageable clutches on said shaft, means including a linearly operable member to be driven by the actuator through an engaged clutch, a pivoted clutch lever responsive to unbalanced forces thereon for engaging one or the other clutches, variable force applying follow-up means from the linearly operable member to the pivoted lever for disengaging an engaged clutch, and autopilot means for initially applying a variable force to the pivoted clutch lever.

4. In a maneuvering automatic pilot for aircraft: a servomotor means comprising a continuously rotating actuator having an output shaft; a further member to be driven; motion transmission means including a pair of engageable clutches each having a part continuously rotated in the same direction by the actuator, for reversibly positioning the further member from said actuator; selective means for engaging one or the other clutch; follow-up means driven by the further means connected to the selective means for disengaging an engaged clutch; electric current operated means independent of said follow-up means initially effecting initial clutch engagement through the selective means, whereby the continuously rotating actuator need only be of power capacity to handle average of minimum-maximum loads, the flywheel energy of the clutch and actuator providing the energy for the peak loads resulting from clutch engagement.

5. A servomotor means comprising a continuously rotating member having an output shaft; a pair of clutch drive members continuously rotating with said shaft; a pair of clutch driven members loosely supported on said shaft; clutch engage means for drivably connecting one or the other of the clutch driven member to the clutch drive member; further means including an irreversible screw jack driven by the engaged clutch driven member; follow-up means positioned by the further means connected to the clutch engage means directly; electrically operated means operatively connected to the clutch engage means independent of the follow-up means for initially causing engagement of a clutch, whereby upon failure of the electrical circuit for the electrically operated means the rotating member by means of the follow-up means effects centering of the further means.

6. A servomotor means comprising: a continuously rotating electric motor; a displaceable member; means including a pair of clutches operable by the motor for reversibly positioning said displaceable member from a normal position; selectively operable means including electrically energized means engaging one or another clutch, follow-up means from the displaceable member opposing the effect of the electrically energized means on the selectively operable means and independent of the electrically energized means, whereby the member is displaced in accordance with the magnitude of the electrical power applied to the electrically energized means.

7. A servomotor means comprising: a continuously rotating electrically energized motor; a displaceable member; a pair of clutches each having a part continuously operated by the motor; clutch engaging means; electrically energized means operating the clutch engaging means; follow-up means from the displaceable member to the clutch engaging means and independent of the electrically energized means opposing the effect of the electrically energized means on the clutch engaging means, whereby upon malfunction in the electrically energized means and operation of the follow-up means to engage a clutch the motor effects return of the displaceable member to a normal position.

8. In a maneuvering automatic pilot for aircraft: a servomotor means comprising a continuously operated motor having an output number; a further member to be driven from a normal position; a pair of engageable clutches for reversibly positioning the further member from said motor; selective force responsive means for engaging one or the other clutches; electric current responsive means operating the selective force responsive means; and follow-up means from the further member to the selective force responsive means for disengaging an engaged clutch, whereby upon failure of the circuit to the current responsive means, the follow-up means causes return of the further member to the normal position.

References Cited by the Examiner

UNITED STATES PATENTS

| | | | |
|---|---|---|---|
| 1,418,335 | 6/1922 | Sperry | 244—77 |
| 2,295,306 | 9/1942 | Tampier | 244—75 |
| 2,635,836 | 4/1953 | Summers | 244—79 |
| 2,890,844 | 6/1959 | Cooper et al. | 244—77 |
| 3,008,558 | 11/1961 | Bennett et al. | 192—100 X |

MILTON BUCHLER, *Primary Examiner.*

ANDREW H. FARRELL, *Examiner.*